US011397106B2

(12) United States Patent
Foster

(10) Patent No.: US 11,397,106 B2
(45) Date of Patent: Jul. 26, 2022

(54) SENSOR ARRANGEMENT

(71) Applicant: THE COMMONWEALTH OF AUSTRALIA, Edinburgh (AU)

(72) Inventor: Scott Foster, Edinburgh (AU)

(73) Assignee: THE COMMONWEALTH OF AUSTRALIA, Edinburgh (AU)

( * ) Notice: Subject to any disclaimer, the term of this patent is extended or adjusted under 35 U.S.C. 154(b) by 263 days.

(21) Appl. No.: 16/644,577

(22) PCT Filed: Sep. 6, 2018

(86) PCT No.: PCT/AU2018/000168
§ 371 (c)(1),
(2) Date: Mar. 5, 2020

(87) PCT Pub. No.: WO2019/046881
PCT Pub. Date: Mar. 14, 2019

(65) Prior Publication Data
US 2020/0386610 A1 Dec. 10, 2020

(30) Foreign Application Priority Data
Sep. 6, 2017 (AU) .................................. 2017903605

(51) Int. Cl.
*G01B 9/02001* (2022.01)
*G01B 9/02015* (2022.01)
(Continued)

(52) U.S. Cl.
CPC ........... *G01H 9/004* (2013.01); *G01B 9/0201* (2013.01); *G01B 9/02014* (2013.01);
(Continued)

(58) Field of Classification Search
CPC .............. G01B 9/0201; G01B 9/02014; G01B 9/02023; G01B 11/161; G01B 11/165;
(Continued)

(56) References Cited

U.S. PATENT DOCUMENTS 1,039,268 A * 9/1912 Gadue .................... B65D 39/04
215/363
5,877,999 A * 3/1999 Holt ........................ H04B 10/27
367/149

(Continued)

OTHER PUBLICATIONS

A.D. Kersey, "Fiber-grating based strain sensor with phase sensitive detection," Proceedings of SPIE, First European Conference on Smart Structures and Materials, 17770E (May 1, 1992).
(Continued)

*Primary Examiner* — Ryan A Lepisto
(74) *Attorney, Agent, or Firm* — Meunier Carlin & Curfman LLC

(57) ABSTRACT

A fiber optic sensor arrangement is disclosed that includes a plurality of optical fiber based sensor elements, the sensor elements configured to modify an associated optical carrier signal in accordance with changes in a sensed quantity at a location of the sensor element and a phase modulation arrangement for phase modulating each optical carrier signal in accordance with respective uncorrelated pseudorandom binary sequence signals. The sensor arrangement also includes an interferometer module for receiving each of the phase modulated optical carrier signals, the interferometer module operable to convert a change in the phase modulated optical carrier signals to a change in optical intensity of the corresponding optical carrier signal to generate a combined modulated optical intensity signal, an optical intensity detector for measuring the combined modulated optical intensity signal and generating a time varying electrical detector signal and an analog to digital convertor to convert the time varying electrical detector signal to a time varying digitized detector signal. Also included in the sensor arrangement is a decorrelator arrangement for decorrelating the time varying digitized detector signal against the respective uncorrelated pseudorandom binary sequence corresponding to each
(Continued)

of the optical carrier signals to recover each of the modulated optical carrier signals and a demodulator for demodulating each of the modulated optical carrier signals to recover the respective optical carrier signal to determine the changes in the sensed quantity at the location of the sensor element.

17 Claims, 6 Drawing Sheets

(51) Int. Cl.
| | |
|---|---|
| *G01B 11/16* | (2006.01) |
| *G01H 9/00* | (2006.01) |
| *G01K 11/32* | (2021.01) |
| *G01K 11/3206* | (2021.01) |
| *G01L 1/24* | (2006.01) |
| *G01N 1/24* | (2006.01) |
| *G01N 21/17* | (2006.01) |
| *G01N 21/25* | (2006.01) |
| *G02B 6/293* | (2006.01) |
| *G02F 1/01* | (2006.01) |
| *G02F 1/125* | (2006.01) |

(52) U.S. Cl.
CPC ........ *G01B 9/02023* (2013.01); *G01B 11/161* (2013.01); *G01B 11/165* (2013.01); *G01K 11/32* (2013.01); *G01K 11/3206* (2013.01); *G01L 1/242* (2013.01); *G01L 1/246* (2013.01); *G01N 21/17* (2013.01); *G01N 21/1717* (2013.01); *G01N 21/255* (2013.01); *G02B 6/2932* (2013.01); *G02F 1/0115* (2013.01); *G02F 1/125* (2013.01); *G01L 1/24* (2013.01); *G01N 21/25* (2013.01); *G01N 2021/1748* (2013.01); *G01N 2021/1757* (2013.01); *G01N 2021/1789* (2013.01)

(58) Field of Classification Search
CPC .... G01H 9/004; G01K 11/32; G01K 11/3206; G01L 1/24; G01L 1/242; G01L 1/246; G01N 21/17; G01N 21/1717; G01N 21/25; G01N 21/255; G01N 2021/1748; G01N 2021/1757; G01N 2021/1789; G02B 6/2932; G02F 1/0115; G02F 1/125
See application file for complete search history.

(56) References Cited

U.S. PATENT DOCUMENTS

| | | | | |
|---|---|---|---|---|
| 6,034,924 | A * | 3/2000 | Vakoc | G01H 9/004 367/149 |
| 6,285,806 | B1 * | 9/2001 | Kersey | G01D 5/35383 385/12 |
| 6,674,928 | B2 * | 1/2004 | Johnson | G01L 1/243 385/12 |
| 6,892,031 | B2 * | 5/2005 | Lee | G01D 5/35383 398/87 |
| 2002/0054408 | A1 | 5/2002 | Lee | |
| 2013/0194578 | A1 * | 8/2013 | Niskanen | G01K 11/32 356/450 |
| 2016/0320232 | A1 | 11/2016 | Nunes et al. | |

OTHER PUBLICATIONS

International Search Report and Written Opinion dated Oct. 25, 2018, from International Application No. PCT/AU2018/000168, 7 pages.

* cited by examiner

SENSOR ARRANGEMENT

PRIORITY DOCUMENTS

The present application claims priority from Australian Provisional Patent Application No. 2017903605 titled "SENSOR ARRANGEMENT" and filed on 6 Sep. 2017, the content of which is hereby incorporated by reference in its entirety.

TECHNICAL FIELD

The present disclosure relates to sensor systems. In one form the present disclosure relates to fiber laser sensor systems.

BACKGROUND

Sensor systems often involve the collation of sensing information from a number of discrete sensors. This often presents a number of data acquisition and interrogation challenges when the number of sensors increase. One non-limiting example is the use of fiber laser sensors in sonar systems. In one example, an erbium doped distributed feedback (DFB) fiber laser may be used as an acoustic sensor as shown in FIG. 1. These are formed by writing a periodic refractive index modulation 110 (ie, a Bragg grating) into a short section of active (erbium doped) optical fiber. Energy is supplied by optically pumping the fiber laser 100 with infra-red radiation 130 from a laser diode which in this example has a wavelength of 980 nm, with only a small fraction of the energy being absorbed by the grating portion and the remainder continuing along the optical fiber.

The absorbed pump energy is converted by a non-linear optical amplification process into virtually single-wavelength infra-red laser output 140 which in this example may fall within a wavelength range between 1520 nm and 1560 nm (the so called C-band). The precise laser wavelength is determined by the resonance condition of the Bragg grating structure and corresponds to the Bragg wavelength $\lambda$, which is equal to twice the grating pitch. Accordingly, the wavelength of the laser emission may be selected at the time of fabrication by adjusting the pitch of the grating portion.

This arrangement may be used as a sensor on the basis that the wavelength of the laser emission will change as the pitch of the Bragg grating changes caused by strain on the fiber. This relationship is described by the approximate formula $$\Delta\lambda/\lambda \approx \Delta\nu/\nu \approx \varepsilon \qquad \text{Equation 1}$$

where $\lambda$ and $\nu$ are the laser wavelength and frequency respectively, and $\varepsilon$ is strain. As the laser output is virtually monochromatic, very small wavelength shifts, and hence very small strains, may be detected and as a result these types of sensors have been employed as acoustic sensors.

As each grating portion is relatively compact, of the order of 5 cm or so, a number of individual fiber laser sensors may be deployed serially along a single fiber with each fiber laser sensor adapted to emit a component carrier optical signal at a wavelength that is wavelength separated from the other component optical signals emitted by the other fiber laser sensors deployed on the same fiber. The wavelength/frequency of each wavelength separated optical signal will then shift in accordance with the locally measured strain at the position of the respective fiber laser sensor. As would be appreciated, the expected wavelength shift is designed to be much less than the wavelength separation between each fiber laser sensor. The multiple fiber laser sensor outputs then return along the same fiber that delivers the pumping radiation.

This arrangement is illustrated schematically in FIG. 2, which shows an example acoustic sensor system 200 consisting of a fiber laser sensor system 100 consisting of an optically pumped fiber incorporating in this example eight individual fiber laser sensors that together emit an optical signal consisting of eight frequency separated component optical signals at wavelengths $\lambda_1, \lambda_2, \ldots, \lambda_8$. An interferometer 300 and signal processing system 400 is then used to determine the individual wavelength or frequency variations for each of the fiber laser sensors for subsequent analysis by a sonar processor 450. Signal processing system 400 in this example includes a wavelength demultiplexer 410 which splits the optical signal from interferometer 300 into its component wavelengths or channels, individual photodiode receivers 420 for each channel and digital acquisition (DAQ) 430 and digital demodulation 440 componentry for each channel.

A limit to deploying sensor systems incorporating a large number of individual sensors is the high system complexity and large power consumption as the number of sensors increase as each sensor requires its own photo-receiver and at least one data acquisition channel. In addition, there are physical constraints to the number of distinct wavelengths that may be practically multiplexed onto a single fiber. As a result, large sensor systems can often require multiple fibers with the attendant duplication of the entire interferometric interrogation system for each fiber including multiple interferometers.

SUMMARY

In a first aspect the present disclosure provides a fiber optic sensor arrangement including:

a plurality of optical fiber based sensor elements, the sensor elements configured to modify an associated optical carrier signal in accordance with changes in a sensed quantity at a location of the sensor element;

a phase modulation arrangement for phase modulating each optical carrier signal in accordance with respective uncorrelated pseudorandom binary sequence signals;

an interferometer module for receiving each of the phase modulated optical carrier signals, the interferometer module operable to convert a change in the phase modulated optical carrier signals to a change in optical intensity of the corresponding optical carrier signal to generate a combined modulated optical intensity signal;

an optical intensity detector for measuring the combined modulated optical intensity signal and generating a time varying electrical detector signal;

an analog to digital convertor to convert the time varying electrical detector signal to a time varying digitized detector signal;

a decorrelator arrangement for decorrelating the time varying digitized detector signal against the respective uncorrelated pseudorandom binary sequence corresponding to each of the optical carrier signals to recover each of the modulated optical carrier signals; and a demodulator for demodulating each of the modulated optical carrier signals to recover the respective optical carrier signal to determine the changes in the sensed quantity at the location of the sensor element.

In another form, the respective uncorrelated pseudorandom binary sequence signals are generated from a common pseudorandom binary sequence signal shifted by a unique time offset.

In another form, the unique time offset for the respective uncorrelated pseudorandom binary sequence signal is introduced by varying the optical path length in the interferometer module for the corresponding optical carrier signal.

In another form, the optical path length for each optical carrier signal is varied by introducing wavelength selective reflectors in an optical path of the interferometer module, the wavelength selective reflectors operable to selectively reflect the corresponding optical carrier signal.

In another form, the phase modulation arrangement includes a phase modulator operating on a fiber conveying an optical signal comprising at least one optical carrier signal, the phase modulator operating in accordance with the common pseudorandom binary sequence signal shifted by the unique time offset corresponding to each of the fibers.

In another form, the phase modulation arrangement includes a periodic phase modulator operable to additionally phase modulate each optical carrier signal by a predetermined periodic phase modulation on a common optical path traversed by all optical carrier signals.

In another form, the optical carrier signals comprise frequency separated component optical signals whose frequency vary with changes in a sensed quantity at a location of the sensor element.

In another form, the plurality of optical fiber based sensor elements are arranged on a unitary optical fiber.

In another form, the plurality of optical fiber based sensor elements are arranged on a plurality of optical fibers.

In another form, the plurality of optical fibers each include fiber based sensor elements modifying the same or similar optical carrier signal.

In a second aspect, the present disclosure provides a sensor system comprising:

a sensor array generating a plurality of frequency separated component optical carrier signals forming together an optical signal conveyed by an optical transmission means;

a phase modulation signal generator for generating a phase modulation signal, the phase modulation signal generator including a pseudorandom binary sequence signal generator to generate a pseudorandom binary sequence signal;

an interferometer comprising a first optical path and a second optical path for both receiving the optical signal, wherein the first optical path includes an optical modulator to receive the optical signal and form a phase modulated optical signal in accordance with the phase modulation signal, the first optical path further including respective wavelength selective reflectors for introducing a respective time delay for each frequency separated component optical signal of the phase modulated optical signal to be then combined on reflection with the optical signal from the second optical path to form a combined optical intensity signal;

a photodetector to measure an intensity of the combined optical intensity signal from the interferometer and to generate a time varying electrical detector signal;

an analog to digital convertor to convert the time varying electrical detector signal to a time varying digitized detector signal;

a decorrelator arrangement including a plurality of decorrelation channels corresponding to each of the frequency separated component optical signals, each decorrelation channel receiving as an input the time varying digitized detector signal from the analog to digital converter and operable to recover a phase modulated component signal corresponding to an individual frequency separated component optical carrier signal based on the respective time delay for that frequency separated component optical carrier signal introduced by the respective wavelength selective reflector and the pseudorandom binary sequence signal; and a demodulator arrangement including a plurality of demodulation channels to demodulate each phase modulated component signal to determine the individual frequency variations of the plurality of frequency separated component optical carrier signals.

In another form, the phase modulation signal generator includes an offset signal generator to generate a periodic phase modulation signal to be combined with the pseudorandom binary sequence signal.

In another form, one or more of the respective wavelength selective reflectors includes a fiber Bragg grating based reflector tuned to the respective frequency separated component optical signal.

In a third aspect, the present disclosure provides a system for combining a first optical signal comprising a first plurality of frequency separated component optical signals conveyed by a first optical transmission means with a second optical signal comprising a second plurality of frequency separated component optical signals conveyed by a second optical transmission means, the second plurality of frequency separated component optical signals having the same or similar wavelengths to the first plurality of frequency separated component optical signals means to form a combined optical signal for conveyance along a third optical transmission means, the system including:

a first pseudorandom binary sequence signal generator to generate a first pseudorandom binary sequence signal at a sequence frequency greater than any of the frequencies of the component optical signals of the first optical signal;

a first optical modulator operable to phase modulate the first optical signal in accordance with the first pseudorandom binary sequence signal to form a first phase modulated optical signal;

a second pseudorandom binary sequence signal generator to generate a second uncorrelated pseudorandom binary sequence signal at a sequence frequency greater than any of the frequencies of the component optical signals of the second optical signal;

a second optical modulator operable to phase modulate the second optical signal in accordance with the second pseudorandom binary sequence signal to form a second phase modulated optical signal; and an optical combiner to combine the first phase modulated optical signal and the second phase modulated optical signal to form a combined optical signal.

In another form, the second pseudorandom binary sequence signal generator is formed by shifting the first pseudorandom binary sequence signal by a predetermined time.

In another form, the system further includes a demultiplexer arrangement to separate the first plurality of frequency separated component optical signals and the corresponding second plurality of frequency separated component optical signals from the combined optical signal, the demultiplexing arrangement including:

a wavelength demultiplexer to separate the combined optical signal into wavelength bands corresponding to the frequency separated component optical signals of the first and second optical signals;

a plurality of photodetectors corresponding to each wavelength band to measure an intensity of the wavelength band to generate a respective time varying electrical detector signal;

a plurality of analog to digital convertors to convert the respective time varying electrical detector signals to respective time varying digitized detector signals corresponding to each wavelength band;

for each respective time varying digitized detector signal a decorrelator arrangement including a first channel and a second channel, the first channel receiving as an input the respective time varying digitized signal and operable to recover a phase modulated component signal corresponding to that wavelength band for the first optical signal based on the first pseudorandom binary sequence signal and the second channel also receiving as an input the respective time varying digitized signal and operable to recover a phase modulated component signal corresponding to that wavelength band for the second optical signal based on the second pseudorandom binary sequence signal.

In a fourth aspect, the present disclosure provides a signal processing signal system including:

a data input stage for receiving a plurality of optical carrier signals, where respective modifications in each optical carrier signal convey information carried by the optical carrier signal;

a phase modulation arrangement for phase modulating each optical carrier signal in accordance with respective uncorrelated pseudorandom binary sequence signals;

an interferometer module for receiving each of the phase modulated optical carrier signals, the interferometer module operable to convert a change in the phase modulated optical carrier signals to a change in optical intensity of the corresponding optical carrier signal to generate a combined modulated optical intensity signal;

an optical intensity detector for measuring the combined modulated optical intensity signal and generating a time varying electrical detector signal;

an analog to digital convertor to convert the time varying electrical detector signal to a time varying digitized detector signal;

a decorrelator arrangement for decorrelating the time varying digitized detector signal against the respective uncorrelated pseudorandom binary sequence corresponding to each of the optical carrier signals to recover each of the modulated optical carrier signals; and a demodulator for demodulating each of the modulated optical carrier signals to recover the respective optical carrier signal to determine the information conveyed by each optical carrier signal.

BRIEF DESCRIPTION OF DRAWINGS

Illustrative embodiments will now be discussed with reference to the accompanying drawings wherein.

In the following description, like reference characters designate like or corresponding parts throughout the figures.

DESCRIPTION OF EMBODIMENTS

Figure 3:
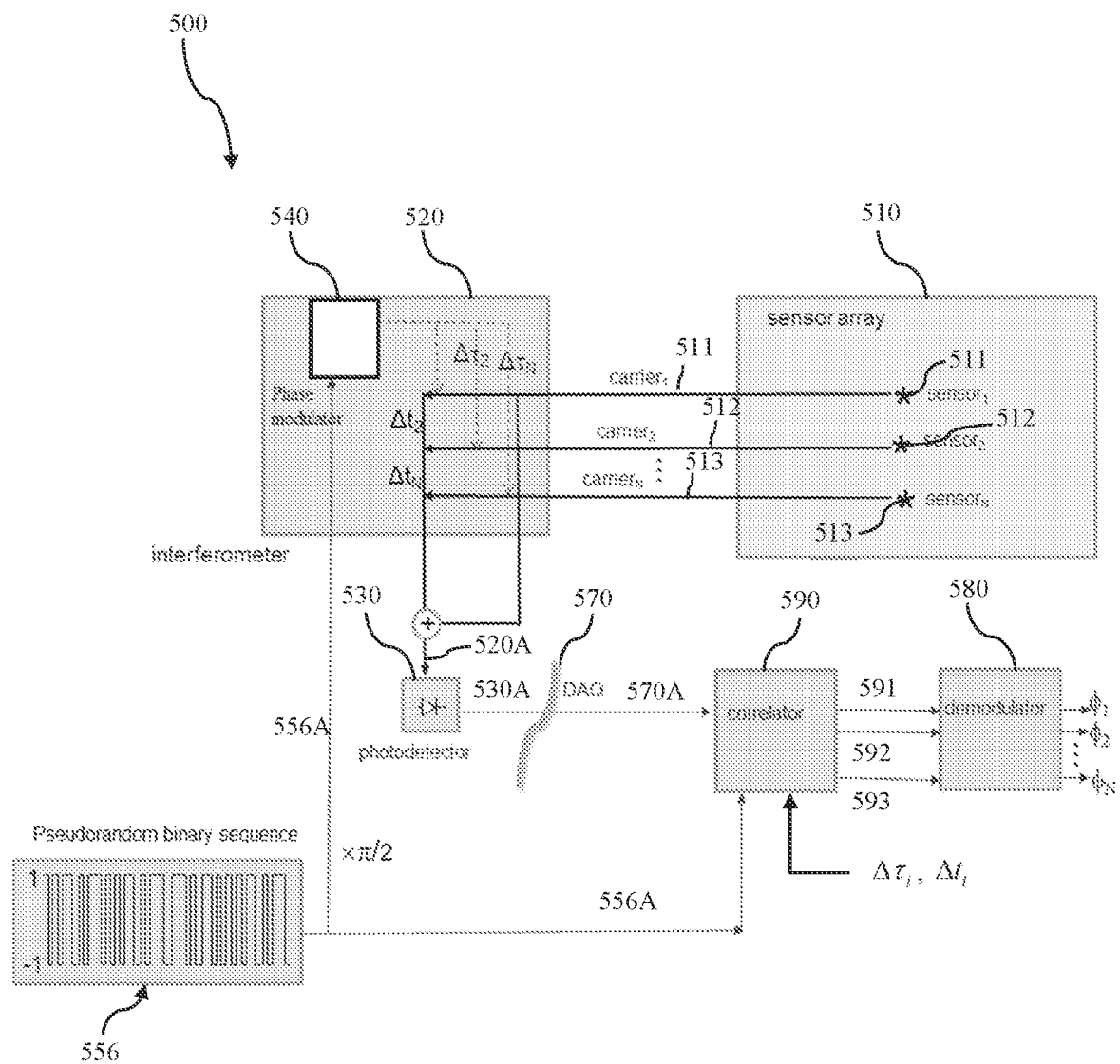
FIG. 3 is a system diagram of a fiber optic sensor arrangement for determining changes in a sensed quantity according to an illustrative embodiment.

Referring now to FIG. 3, there is shown a fiber optic sensor arrangement 500 for determining changes in a sensed quantity in accordance with an illustrative embodiment. Fiber optic sensor arrangements includes a sensor array 510 comprising multiple sensor elements 511, 512, 513 each configured to modify the wavelength/frequency of an associated optical carrier signal 511A, 512A, 513A in accordance with changes in a sensed quantity at the relevant location of the respective sensor element.

Fiber optic sensor arrangement 500 further includes a phase modulation arrangement 540 for phase modulating each optical carrier signal 511A, 512A, 513A in accordance with respective uncorrelated pseudorandom binary sequence signals. In this illustrative embodiment, the respective uncorrelated pseudorandom binary sequence signals are generated from a common pseudorandom binary sequence signal generator 556 whose output is then shifted by a unique time offset $\Delta\tau_i$, $\Delta t_i$ corresponding to each of the optical carrier signals 511A, 512A, 513A.

Fiber optic sensor arrangement 500 includes an interferometer module 520 for receiving each of the optical carrier signals and which functions to convert changes in the now phase modulated optical carrier signals to a corresponding change in optical intensity of the corresponding optical carrier signal 511A, 512A, 513A to generate a combined modulated optical intensity signal 520A.

Fiber optic sensor arrangement 500 also includes an optical intensity detector 530 for measuring the combined modulated optical intensity signal and generating a time varying electrical detector signal 530 which is then converted by analog to digital convertor 570 to a time varying digitized detector signal 570A.

Time varying digitized detector signal 570A is then processed by a decorrelator arrangement 590 which decorrelates the time varying digitized detector signal 570A against the respective uncorrelated pseudorandom binary sequence signal corresponding to each of the optical carrier signals 511A, 512A, 513A. In this example, the uncorrelated pseudorandom binary sequence signals are generated from common pseudorandom binary sequence signal generator 556 whose signal 566A is shifted by the unique offset time $\Delta\tau_i$, $\Delta t_i$ corresponding to each of the optical carrier signals 511A, 512A, 513A to recover each of the modulated optical carrier signals 591A, 592A, 593A which are then processed by the demodulator 580 which demodulates each of the modulated optical carrier signals to determine the changes $\phi_1$, $\phi_2$, $\phi_3$ in the sensed quantity at the location of the sensor element.

In one example, the individual optical carrier signals may consist of light of distinct wavelengths propagating in a common waveguide (optical fiber). As will be appreciated the modification of the wavelength on each optical carrier signal caused by the sensor element in accordance with any changes in the sensed quantity must be small compared to the differences between the distinct carrier wavelengths. In another example, the individual optical carrier signals may consist of distinct transverse modes of an optical fiber. In yet another example, the individual optical carrier signals may consist of light of distinct polarizations. In yet another example, the individual carrier signals could consist of light of identical characteristics propagating in distinct waveguides (optical fibers).

The individual optical carrier signals may be conveyed on a common optical fiber or may be carried on individual optical fibers or any combination of both. The optical carrier signals may be generated by the sensor elements such as in the case of a DFB fiber laser or be separately generated and modified by the sensor element.

As would be appreciated, fiber optic sensor arrangement 500 allows the information conveyed by multiple carrier signals to be combined and then measured by, in this example, a single photodetector and the resulting digitized signal then decorrelated into separated carrier signals where it can be demodulated.

Figure 4:
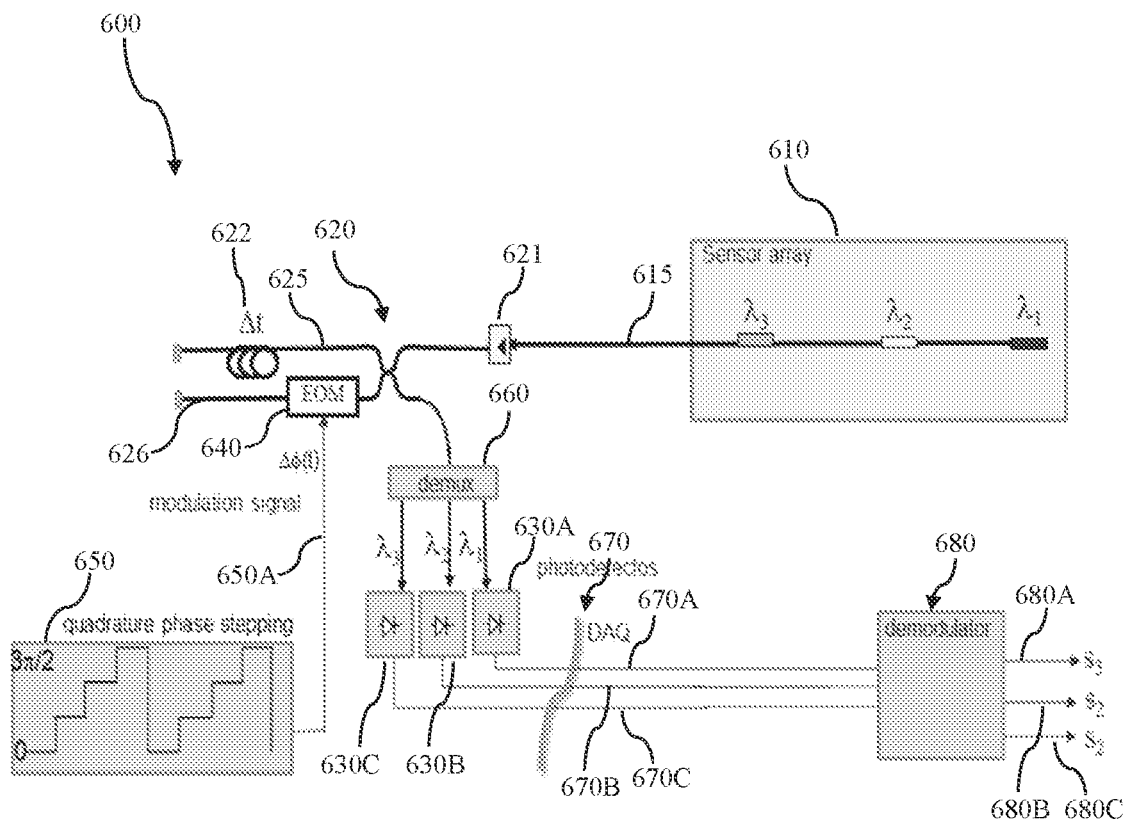
FIG. 4 is a system diagram of a multiplexed fiber laser array acoustic sensor including a digital phase stepping demodulation scheme for determining frequency variations in the individual sensors.

Referring now to FIG. 4, there is shown an interferometer setup 600 for determining individual frequency variations for a number of frequency separated component carrier optical signals corresponding to optical carrier signals to which the fiber optic arrangement depicted in FIG. 3 may be applied. In this example, the optical carrier signals comprise three optical signals $\lambda_1$, $\lambda_2$ and $\lambda_3$ originating from a sensor array 610 designed to detect acoustic signals. As would be appreciated, in this embodiment the purpose of the interferometer setup or module 600 is to convert wavelength/frequency fluctuations in the optical carrier signals $\lambda_1$, $\lambda_2$ and $\lambda_3$ into corresponding intensity fluctuations.

In this example, the optical signal or laser output 615 from sensor array 610 is fed into the input port 621 of an unbalanced fiber optic interferometer 620 having a first arm or optical path 625 and a second arm or optical path 626, the first arm 625 incorporating a path imbalance $\Delta L$ between the two light paths resulting in a relative time delay $\Delta t = 2\Delta L/c$ 622 in the first arm 625 (where c is the effective speed of light in the fiber) as compared to the second arm 626. The combined modulated optical intensity signal from the two arms 625, 626 of interferometer 620 is then passed through a demultiplexer 660 having passbands configured to separate and pass the respective wavelengths $\lambda_1$, $\lambda_2$ and $\lambda_3$ where the intensity is then measured by associated photodetectors 630A, 630B, 630C for each respective wavelength which each generate a time varying electrical detector signal.

In a typical setup such as depicted in FIG. 4, the time varying electrical detector signal $I_1$ measured at photodetector 630A corresponding to $\lambda_1$ is modulated by the optical path imbalance. Referring to the general case, if the frequency of the component carrier optical signal is of the form $v = v_0 + \Delta v(t)$ where $\Delta v(t)$ corresponds to the frequency variation that is of interest then the electrical signal I may be expressed as:

$$I = I_0 + A\cos(\phi_0 + \Delta t \Delta v(t)) \qquad \text{Equation 2}$$

where $\phi_0$ is a constant phase offset. Accordingly, the frequency variation as a result becomes encoded as a phase modulation on the (DC) electrical signal. As would be appreciated, a potential difficulty illustrated by Equation 2 is that the change in electrical detector signal for a given change in frequency will depend on $\phi_0$ which is typically unknown and which further may drift slowly over time.

In order to address this issue, the phase information may be encoded on an RF carrier by injecting a known phase modulation $\Delta\phi(t)$ into interferometer 620 at some RF frequency $f_c$. Then the expression for electrical signal I may be expressed as:

$$I = I_0 + A\cos(\phi_0 + \Delta\phi(t) + \Delta t \Delta v(t)) \qquad \text{Equation 3}$$

The carrier waveform $\Delta\phi(t)$ will be dependent on the details of the demodulation scheme that is to be employed. One example digital demodulation scheme is now described with reference to FIG. 3. As any demodulation is performed following an analog to digital conversion of the electrical signal I it is appropriate to consider the demodulation process as a discrete signal processing process.

Consider a sequence of N samples taken over a short time interval $T_c$ such that $T_c \ll 1/f_{max}$ where $f_{max}$ is the information bandwidth of the signal (ie, $T_c$ is small enough that the measurand may be considered constant during the sampling interval). The $n^{th}$ sample may be written as:

$$I_n = b + a\cos(\Delta\phi_n + \phi) \qquad \text{Equation 4}$$

where b is the residual DC component (ideally zero in our case) and $\Delta\phi_n$ is the known phase modulation at the time of the $n^{th}$ sample. For a single sample, Equation 4 may be viewed as an equation in 3 unknowns: b, a and $\phi$. It follows that a minimum of 3 discrete samples are then needed to obtain a single demodulated phase measurement. By utilizing 4 samples per carrier cycle, this illustrative algorithm incorporates the minimum degree of redundancy necessary to achieve robustness against phase errors. In particular, suppose N=4 and $$\Delta\phi_n = \frac{n\pi}{2}, n = 0, \ldots, 3 \qquad \text{Equation 5}$$

A robust estimation of phase may then be obtained from the formula $$\phi = \arctan\left(\frac{3I_1 - (I_0 + I_2 + I_3)}{(I_0 + I_1 + I_3) - 3I_2}\right) \qquad \text{Equation 6}$$

To generate the controlled phase modulation an offset signal generator 650 is employed which generates a quadrature phase stepping signal 650A to drive electro-optic phase modulator (EOM) 640 which is incorporated into the second arm 626 of interferometer 620.

As depicted in FIG. 4, the sequence of phase offsets in accordance with Equation 5 is repeated periodically at a frequency $f_c = 1/T_c$ to obtain an oversampled time series for the modulation signal $\Delta\phi(t)$ which is then low-pass filtered and down sampled to the desired measurement bandwidth according to standard digital signal processing procedures. Note that the unknown phase offset $\phi_0$ merely manifests as a DC bias and is eliminated once high pass filtering is performed. The remainder of $\phi$ is then directly proportional to $\Delta v(t)$ via Equation 3 above.

As can be seen from FIG. 4, and as discussed in the background, each wavelength channel $\lambda_1$, $\lambda_2$ or $\lambda_3$ requires its own optical intensity detector in the form of photodetectors 630A, 630B, 630C and corresponding data acquisition channel 670A, 670B, 670C provided by multichannel analog to digital converter 670 and demodulation channel 680A, 680B, 680C provided by multichannel demodulator 680. Despite the improvements brought about by demodulation schemes such as those referred to above, the requirement for these individual channels for each component carrier optical signal still results in high system complexity and large power consumption when the number of sensors is large. In other demodulation schemes, two photodetectors, digital acquisition and demodulating channels are required for each wavelength further increasing the complexity of such systems. This problem is further exacerbated when multiple fibers are employed in any sensor array.

Figure 5:
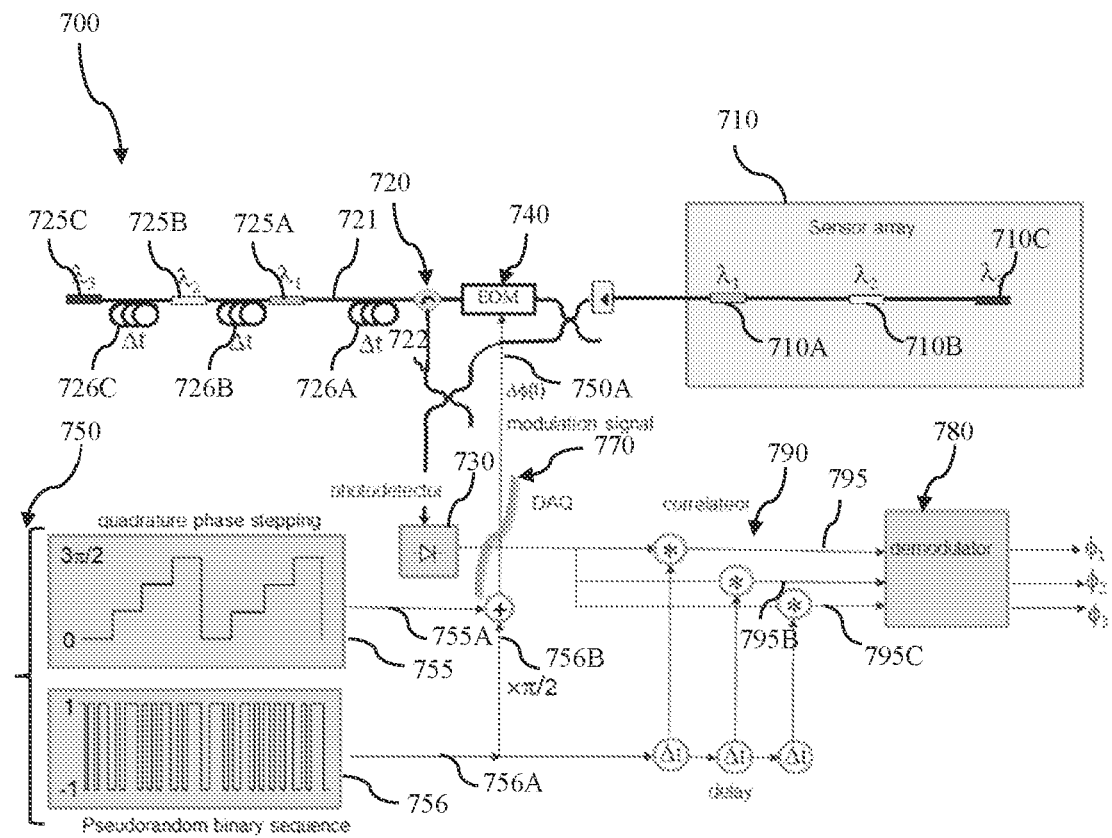
FIG. 5 is a system diagram of a system for determining the individual frequency variations of a plurality of frequency separated component carrier optical signals according to another illustrative embodiment.

Referring now to FIG. 5, and in accordance with the fiber optic sensor arrangement depicted in FIG. 3, there is shown a fiber optic sensor arrangement 700 for in this example determining the individual frequency variations of a plurality of frequency separated component carrier optical signals 710A, 710B, 710C according to an illustrative embodiment. In this illustrative embodiment, frequency separated component carrier optical signals 710A, 710B, 710C originate from a fiber based acoustic sensor array 710 but as would be appreciated, the presently described systems and methods may be employed to any sensor system or indeed any other system that generates multiple carrier optical signals whose individual wavelength changes require determination.

In the context of frequency separated component carrier optical signals where the frequency of the carrier optical signal is of interest, some example applications of the present methods and systems include, but are not limited to, non-acoustic fiber optic sensor systems such as strain measurement systems, pressure sensors, velocity sensors, accelerometers, magnetometers or electric field measurement sensors (eg, a DFB fiber laser arrangement coated with a suitable magnetic material) or temperature sensors.

Broadly, fiber optic sensor arrangement 700 includes an interferometer module in the form of an unbalanced fiber optic interferometer 720 and a phase modulation arrangement comprising an EOM 740 which modulates the phase of the input optical signal comprising frequency separated component carrier optical signals 710A, 710B, 710C based on phase modulation signal 750A originating from phase modulation signal generator 750 to form a phase modulated optical signal.

In this illustrative embodiment, phase modulation signal generator 750 includes an offset signal generator 755 to generate a quadrature phase stepping signal 755A and a pseudorandom binary sequence signal generator 756 to generate a pseudorandom binary sequence signal 756A which flips the phase (randomly) by 180 degrees at a rate $f_r$ which is large compared to the carrier frequency $f_c$. The random phase modulation $\Delta\phi_{ran}$ 756B is then obtained by multiplying the pseudorandom binary sequence by $\pi/2$, ie, $\Delta\phi_{ran}=(t)\pi/2$, where r(t) takes values±1. This random phase modulation signal 756B is then added to the quadrature phase stepping signal $\Delta\phi(t)$ 755A to form the phase modulation signal $\Delta\phi(t)+\Delta\phi_{ran}$ 750A.

Fiber optic sensor arrangement 700 further comprises an optical intensity detector in the form of photodetector 730 for measuring the combined modulated optical intensity signal from interferometer 720 and generating a time varying electrical detector signal. As would be appreciated, optical intensity detector may be any device operable to convert an optical intensity signal to a time varying electrical detector signal, including, but not limited to, photomultipliers, photodiode or charge coupled device (CCD) based arrangements.

In addition, fiber optic sensor arrangement 700 includes an analog to digital converter 770 for converting the output from photodetector 730 to a time varying digitized detector signal, multiple digital decorrelators or a multichannel decorrelator 790 receiving as an input the digitized detector signal split in this example three ways for each channel and functioning to recover phase modulated component carrier signals 795A, 795B, 795C on each channel and a further associated multichannel demodulator 780 to recover the frequency separated component carrier optical signal 710A, 710B, 710C and hence the variation in frequency for each of these signals.

The first arm or optical path 721 of interferometer 720 further includes a series of wavelength selective reflectors 725A, 725B, 725C corresponding to the wavelengths of each of the component carrier optical signals 710A, 710B, 710C which introduce a respective time offset or delay $\Delta t$, $2\Delta t$ and $3\Delta t$ respectively to each of the phase modulated component carrier optical signals 710A, 710B, 710C through the introduction of additional time delay coils 726A, 726B, 726C. The optical signal from the first arm 721 following reflection is then combined with the optical signal from the second arm 722 to form a combined modulated optical intensity signal. This has the effect of phase modulating each of the component carrier optical signals 710A, 710B, 710C by a respective uncorrelated pseudorandom binary sequence signal arising from a common pseudorandom binary sequence signal 756B that are each time shifted by a unique time offset $\Delta t_i$ corresponding to each of the optical carrier signals. In this case, unique time offsets $\Delta t_i$ correspond to the delays $\Delta t$, $2\Delta t$ and $3\Delta t$ introduced by varying the optical path length in interferometer 720 for each of the component carrier optical signals 710A, 710B, 710C.

To illustrate the effect of this combination of system features, the case of a single component carrier optical signal is now described. The combined signal measured by photodetector 730 for a single component carrier optical signal (neglecting the DC term) and assuming a time delay $\Delta t$ for that component carrier optical signal may by analogy with Equation 3 above be written as:

$$I(t)=r(t-\Delta t)\cos(\phi_0+\Delta\phi(t)+\Delta t\Delta v(t)) \qquad \text{Equation 7}$$

As r(t) is rapidly varying, the time varying electrical detector signal produced by photodetector 730 will appear as random noise. $\Delta\phi$ and $\Delta v$ are assumed slowly varying compared to r and are treated as constant over the delay interval $\Delta t$. By construction, $r^2=1$, and as such the phase modulated component carrier signal (eg, 795A) may be recovered by the use of correlator 790 by multiplying I(t) by the known function r(t−$\Delta t$) but only if the correct time delay $\Delta t$ for that component carrier optical signal is employed.

In the case of the three component carrier optical signals 710A, 710B, 710C in fiber optic sensor arrangement 700, component carrier optical signal 710A has an associated time delay $\Delta t$, component carrier optical signal 710B has an associated time delay of $2\Delta t$ and component carrier optical signal 710C has an associated time delay $3\Delta t$ as a result of their traversal and reflection in the first arm 721 of two arm interferometer 720 as described previously. Accordingly, to recover the phase modulated component signal corresponding to optical signal 710A, the time varying digitized detector signal output from analog to digital converter 770 is cross correlated with the pseudorandom binary sequence signal delayed by $\Delta t$ in correlator 790.

Similarly, to recover the phase modulated component signals 795B, 795C corresponding to optical signals 710B and 710C respectively, the time varying digitized detector signal output analog to digital converter 770 is cross correlated with the pseudorandom binary sequence signal delayed by $2\Delta t$ and $3\Delta t$ respectively in correlator 790. As such, the time varying digitized signal is decorrelated against the respective uncorrelated pseudorandom binary sequence corresponding to each of the optical carrier signals to recover each of the modulated optical carrier signals. As described above, in this example, the respective uncorrelated pseudorandom binary sequences are generated from a common pseudorandom binary sequence signal shifted by a unique time offset corresponding to each of the optical carrier signal.

In this manner, it is possible to extract the information from each individual sensor with no requirement to split or demultiplex the component carrier optical signals into separate channels corresponding to their wavelength or frequencies prior to detection. As would be appreciated, de-multiplexing into separated component carrier optical signals occurs in the digital domain as part of the cross correlation process to recover the phase modulated component carrier signal which may then be demodulated by respective demodulation channels to recover the frequency variation information for each component carrier optical signal.

As this is a digital technique it is most clearly represented in discrete terms. Considering a sequence of N samples labelled by index n then let $r_n=\pm 1$ be a discrete random sequence. The sequence of samples N constitutes a single cycle of the RF carrier (ie $f_c=f_r/N$). For a four point phase stepping demodulation, Equation 5 then becomes:

$$\Delta\phi_n = \frac{\text{floor}(4n/N)\pi}{2}, n=0, \ldots, N-1 \qquad \text{Equation 8}$$

Defining the phase quadrature index p=floor(4n/N) then $\Delta\phi(t)$ may be relabeled as:

$$\Delta\phi_p = \frac{p\pi}{2}, p=0, \ldots, 3 \qquad \text{Equation 9}$$

Supposing that the sensor array consists of M frequency separated optical components of wavelengths $\lambda_m$ and suppose the time delay for the $m^{th}$ wavelength corresponds to an integer number of samples $T_m$, the $n^{th}$ sample recorded by photodetector 730 may then be written as:

$$I_n = \sum_m r_{n-T_m} \cos(\Delta\phi_p + \phi_m) \qquad \text{Equation 10}$$

where $\phi_m$ is the unknown phase representing the signal on sensor m. The signal on sensor m at each phase quadrature p is then obtained from the convolution:

$$I_p^{(m)} = N^{-1} \Sigma_{n=Np/4}^{N(p+1)/4} r_{n-T_m} I_n = \cos(\Delta\phi_p + \phi_m) \qquad \text{Equation 11}$$

where the incoherence of r has been employed, ie:

$$N^{-1} \Sigma_n r_n r_{n-m} \cong \delta_{nm} \qquad \text{Equation 12}$$

From Equation 11, phase demodulation in demodulator 780 can proceed as normal for each component signal 795A, 795B, 795C corresponding to each sensor using Equation 6 above. Suppose for concreteness that the time delay for the $m^{th}$ wavelength is $T_m=m\Delta t$. The requirement that $T_m$ constitutes an integer number of samples introduces the constraint $f_r>1/\Delta t$; ie, sampling should occur fast enough to resolve the time delay between successive wavelength channels. As an example, a delay coil 726B of length 10 m long would introduce a time delay $\Delta t \cong 100$ ns (ie, $10^{-7}$ s) between sensors 725A and 725B. Accordingly, in this example, to achieve the necessary incoherence between sensors, the random sequence $r_n$ should switch at a rate exceeding $10^7$ Hz.

In this illustrative embodiment, wavelength selective reflectors are formed from fiber Bragg gratings matched to the wavelength of the component carrier optical signals 710A, 710B, 710C. In other embodiments, the wavelength selective reflectors may be formed using Fabry Perot filters as an example.

While in this illustrative embodiment, there are three frequency separated component optical signals, it will be appreciated that the present system is applicable to two or more carrier optical signals. Similarly, while in this illustrative embodiment, the respective time delay introduced for each component carrier optical signal in the two arm interferometer and then subsequently used for the recovery of the phase modulated component optical signal is a multiple of a standard time delay, it will be appreciated that this is not a necessary requirement as long as any introduced time delay for a given component carrier optical signal is then used in the cross correlation process to recover the phase modulated component signal and the introduced time delay is different to that used for the other component optical signals.

Figure 1:
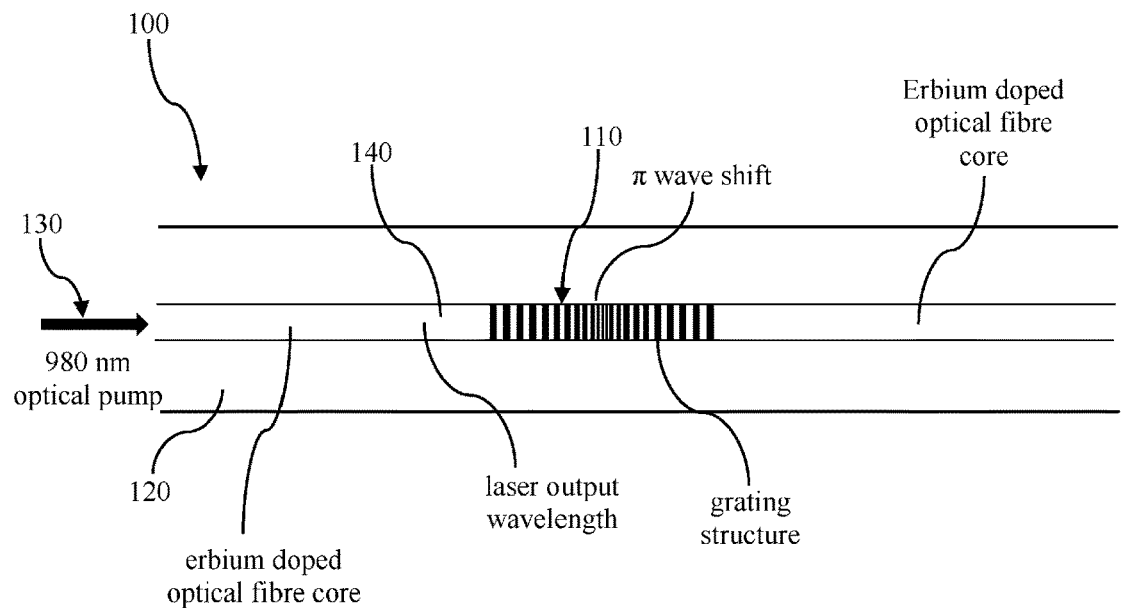
FIG. 1 is a schematic of a distributed feedback (DFB) fiber laser.
Figure 2:
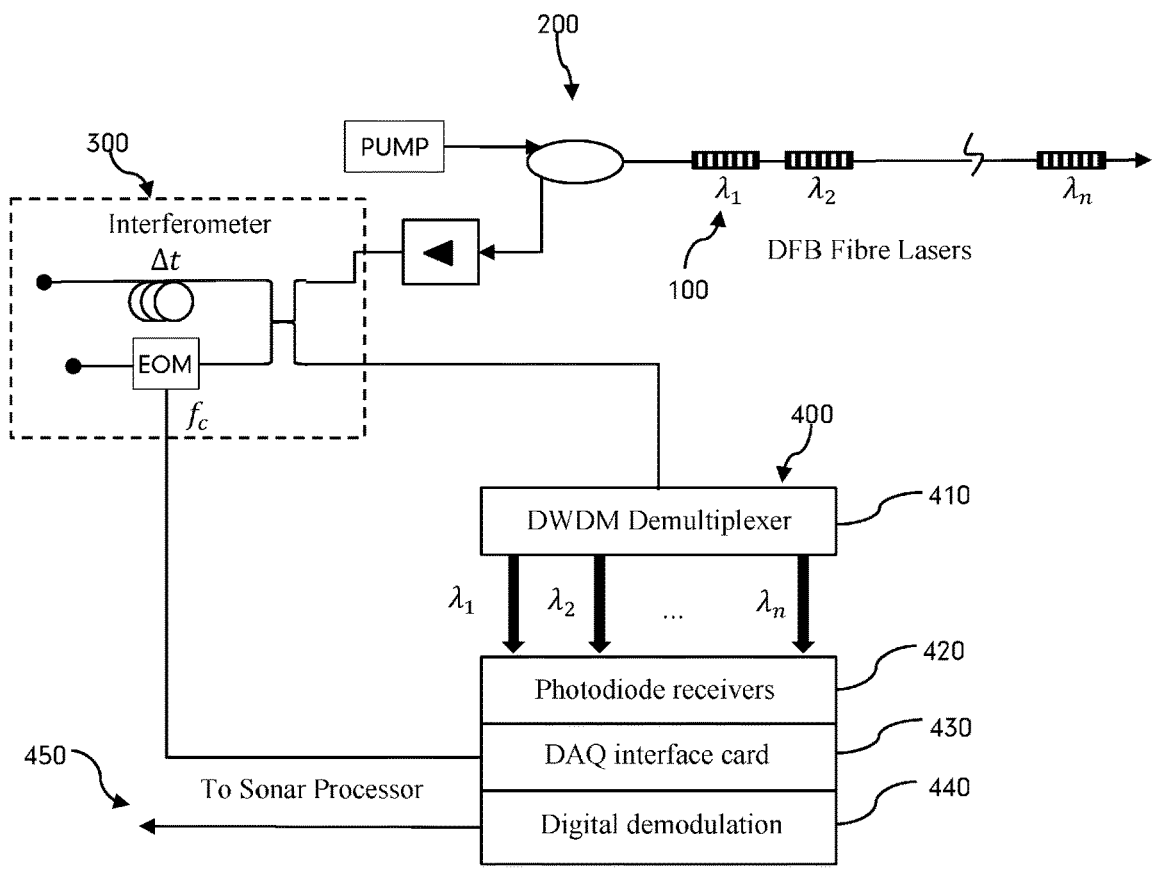
FIG. 2 is a system diagram of a multiplexed fiber laser array acoustic sensor system.

In addition to reducing the complexity of standard systems such as those illustrated in FIGS. 2 and 4 involving multiple photodetectors and associated processing channels, the above described system has an additional advantage in that the wavelength selective reflectors 725A, 725B, 725C in the form of fiber Bragg grating based reflectors incorporated into two arm interferometer 720 may be actively tuned to account for any long term drift in the wavelength or frequency of the respective component optical carrier signal. Where component optical signals are from an acoustic sensor such as a towed fiber array sensor, long term drift in the wavelength may arise due to changes in the ocean temperature. This may be compared to the conventional dispersive demultiplexer 410 as used in prior art such as that illustrated in FIG. 4, which are typically designed to operate on a fixed International Telecommunications Union (ITU) wavelength grid and are not readily adjusted.

Figure 6:
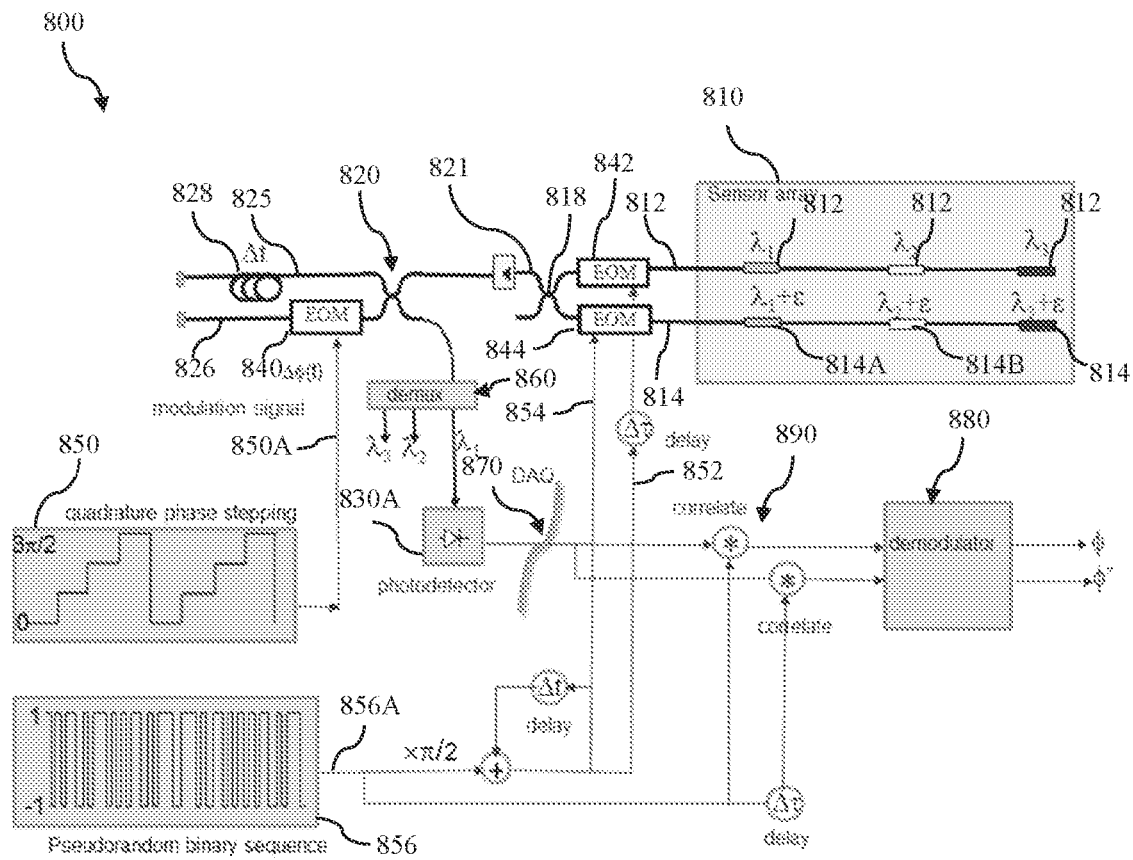
FIG. 6 is a system diagram of a system for determining the individual frequency variations of a plurality of frequency separated component carrier optical signals according to yet another illustrative embodiment.

Referring now to FIG. 6, there is shown a fiber optic sensor arrangement 800 for determining the individual frequency variations of a plurality of frequency separated component optical signals 812A, 812B, 812C and 814A, 814B, 814C according to another illustrative embodiment. In this example, component optical signals are generated by a sensor array 810 with component optical signals 812A, 812B, 812C forming a first optical signal originating from first fiber 812 and component optical signals 814A, 814B, 814C having the same or similar wavelength as component optical signals 812A, 812B, 812C from the first fiber 812 forming a second optical signal originating from second fiber 814.

This may be represented as the first optical signal comprising component optical signals having a set of distinct wavelengths $\lambda_m$ and the second optical signal comprising component optical signals having a similar set of wavelengths $\lambda_m+\varepsilon_m$ where the differences $\varepsilon_m$ account for possible small differences between the nominally equivalent wavelength channels in sensor array 810. These differences may be due either to limitations in manufacturing tolerances, or by design. However, $\varepsilon_m$ are small enough that the $m^{th}$ channel on each fiber falls within the passband of the $m^{th}$ channel of the wavelength-division multiplexing (WDM) de-multiplexer (DEMUX) 860.

If the first and second optical signals were combined optically there would be no way to recover the information corresponding to each fiber 812, 814. Accordingly, in this illustrative embodiment the first and second optical signals are first phase modulated by respective first and second optical modulators 842, 844 in accordance with first and second pseudorandom binary sequences 852, 854. While in principle, first and second pseudorandom binary sequences 852, 854 may be generated by respective pseudorandom binary sequence generators, in this embodiment a common pseudorandom binary sequence generator 856 is employed with the first pseudorandom binary sequence signal 852 corresponding to a version of second pseudorandom binary sequence signal 854 time delayed by $\Delta\tau$. In this manner, respective uncorrelated pseudorandom binary sequence signals 852, 854 are generated by shifting one signal with respect to each other by $\Delta\tau$. As would be appreciated, this may be generalized to the use of $\Delta\tau_i$ to generate i+1 uncorrelated pseudorandom binary sequence signals as required.

First and second optical signals following phase modulation are then combined by an optical combiner in the form of an optical coupler 818 prior to being fed into two arm interferometer 820 having a first arm 825 including a time delay $\Delta t$ 828 and a second arm 826 incorporating a EOM 840 driven by offset signal generator 850 which generates a quadrature phase stepping signal 850A in a similar manner to the arrangement described with respect to FIG. 4.

In the case of a single pseudorandom binary sequence signal generator 756 generating a pseudorandom binary sequence signal 756A r(t) consisting of a pseudorandom sequence of ±1 which for the general case of i fibers is then delayed for each fiber by an amount $t_i$, assuming that the injected phase on the $i^{th}$ fiber satisfies the relationship that $\Delta\phi_{ran}^i(t)=\Delta\phi_{ran}^i(t-\Delta t)+r(t-t_i)\pi/2$, then the interferometer output due to a single wavelength (say $\lambda_1$) as provided by photodetector 630A and analog to digital converter 870 is defined by:

$$I(t) = \sum_i r(t - t_i)\cos(\phi_0^{(i)} + \Delta\phi(t) + \Delta t \Delta v^{(i)}(t)) + \text{cross terms} \quad \text{Equation 13}$$

Here the cross terms involve possible cross-interference between the signals from each fiber. In the case of two channels such as depicted in FIG. 6, the individual signal for each optical fiber can be separated by correlation processing so long as the relative offset $\Delta\tau=t_2-t_1$, is non-resonant with the interferometer delay $\Delta t$. As an example, a sufficient condition would be $\Delta\tau>2\Delta t$. Furthermore, the relative offset $\Delta\tau$ or time delay between phase modulation signals 852 and 854 should exceed the coherence time of r(t) (ie, $\Delta\tau>1/f$), implying that $\Delta\tau$ is resolvable at sampling rate $f_r$. In the digital domain, the $n^{th}$ sample recorded by the photodetector may then be written as:

$$I_n = \sum_i r_{n-T_i} \cos(\Delta\phi_p + \phi_i) \quad \text{Equation 14}$$

where $\Delta\phi_p$ is the RF phase modulation in accordance with Equation 9 and $T_i$ is the number of samples corresponding to the time delay $t_i$. Then the signal on the $i^{th}$ fiber is obtained from the convolution:

$$I_p^{(i)} = N^{-1}\sum_{n=Np/4}^{N(p+1)/4} r_{n-T_i} I_n = \cos(\Delta\phi_p + \phi_i) \quad \text{Equation 15}$$

where again use is made of Equation 12 using correlator 890. From Equation 15 phase demodulation can proceed as normal for each sensor on the $i^{th}$ fiber using Equation 6 by demodulator 880.

As would be appreciated, and in comparison to the embodiment system described with respect to FIG. 4, the delay time $\Delta\tau$ corresponding in this embodiment to the delay introduced into the pseudorandom binary sequence signal 856A is independent of the physical interferometer path imbalance $\Delta t$ 828 and can essentially be selected as required. As discussed above, in another embodiment, separate pseudorandom number generators may be employed to generate totally independent phase modulation sequences for each fiber.

As would be appreciated, optical signals could be combined from an arbitrary number of fibers with the only potential tradeoff being the splitting loss of approximately 3 dB for each optical coupler. Accordingly, combining N fibers will result in a loss of the order of 3(N−1) dB for the first 2 fibers in the beam combination sequence, reducing successively to 3 dB for the final fiber.

As depicted, the fiber optic sensor arrangement 800 illustrated in FIG. 6 still requires demultiplexer 860 to separate the wavebands corresponding to the frequency separated component optical carrier signals [812A, 814A], [812B, 814B] and [812C, 814C]. In another illustrative embodiment, aspects of the systems illustrated in FIGS. 5 and 6 may be combined to result in a system that would enable interrogation of full scale arrays with a single interferometer and as few as one input channels.

Figure 7:
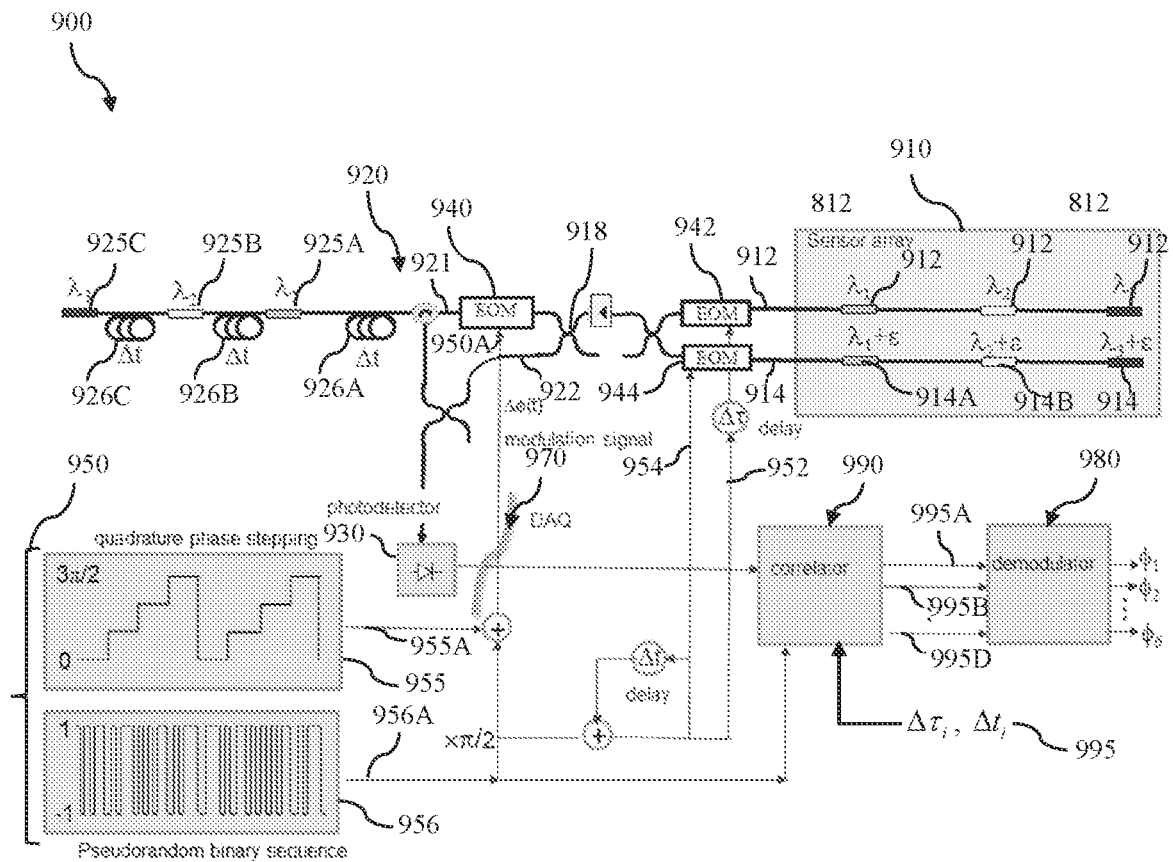
FIG. 7 is a system diagram of a system for determining the individual frequency variations of a plurality of frequency separated component carrier optical signals according to a further illustrative embodiment.

Referring now to FIG. 7, there is shown a fiber optic sensor arrangement 900 according to another illustrative embodiment including a plurality of optical based sensor elements or sensor array 910.

Fiber optic sensor arrangement 900 in this embodiment determines the individual frequency variations of a plurality of frequency separated component carrier optical signals 912A, 912B, 912C corresponding to sensor elements arranged on one optical fiber 912 and combining to form a first optical signal and optical signals 914A, 914B, 914C corresponding to sensor elements arranged on a separate fiber 914 and combining to form a second optical signal. This portion of sensor arrangement 900 is similar to the fiber optic sensor arrangement 800 depicted in FIG. 6.

Fiber optic sensor arrangement 900 includes phase modulation arrangement incorporating first and second phase modulators 942, 944 operating in accordance with first and second uncorrelated pseudorandom binary sequence signals 952, 954 originating from a common pseudorandom binary sequence generator 956, where the first pseudorandom binary sequence signal 952 corresponds to a version of second pseudorandom binary sequence signal 954 time delayed by $\Delta\tau$.

First and second optical signals following phase modulation in accordance with pseudorandom binary sequence signals 952, 954 are then combined by an optical combiner in the form of an optical coupler 918. Phase modulation arrangement further includes a further phase modulator in the form of EOM 940 driven by phase module signal generator 950 which modulates the phase of the input optical signal comprising the combined first and second optical signals which themselves comprise the combination of frequency separated component carrier optical signals 912A, 912B, 912C and 914A, 914B, 914C respectively, the first and second optical signals each separately having been phase modulated by phase modulators 942, 944 as described above.

Similar to sensor arrangement 700, phase modulation signal generator 950 includes an offset signal generator 955 to generate a quadrature phase stepping signal 955A and a pseudorandom binary sequence signal generator 956 to generate a pseudorandom binary sequence signal 956A. Phase stepping signal 955A and pseudorandom binary sequence signal 956A are then combined to form phase modulation signal 950A which drives EOM 940.

Fiber optic sensor arrangement 900 further includes an interferometer module in the form of unbalanced interferometer 920 and an optical intensity detector in the form of photodetector 930 for measuring the combined modulated optical intensity signal from interferometer 920 and generating a time varying electrical detector signal.

The first arm or optical path 921 of interferometer 720 further includes a series of wavelength selective reflectors 925A, 925B, 925C corresponding to the wavelengths of each of the component carrier optical signals [912A, 914A], [912B, 914B], [912C, 914C] which introduce a respective time offset or delay $\Delta t$, $2\Delta t$ and $3\Delta t$ respectively to each of the phase modulated component carrier optical signals [912A, 914A], [912B, 914B], [912C, 914C] through the introduction of additional time delay coils 926A, 926B, 826C. The optical signal from the first arm 921 following reflection is then combined with the optical signal from the second arm or optical path 922 to form a combined modulated optical intensity signal.

This has the effect of phase modulating each pair of component carrier optical signals [912A, 914A], [912B, 914B], [912C, 914C] by a respective uncorrelated pseudorandom binary sequence signal arising from a common pseudorandom binary sequence signal 956A that are each time shifted by a unique time offset $\Delta t_i$ corresponding to each of the pairs of optical carrier signals. In this case, unique time offsets $\Delta t_i$ correspond to the delays $\Delta t$, $2\Delta t$ and $3\Delta t$ introduced by varying the optical path length in interferometer 920 for each of the pairs of component carrier optical signals [912A, 914A], [912B, 914B], [912C, 914C], As with previous sensor arrangements, fiber optic sensor arrangement 900 includes an analog to digital converter 970 for converting the output from photodetector 930 to a time varying digitized detector signal, multiple digital decorrelators or a multichannel decorrelator 990 receiving as an input the digitized detector signal split in this example six ways for each channel and functioning to recover phase modulated component carrier signals 995A, 995B . . . 995D on each channel and a further associated multichannel demodulator 980 to recover the frequency separated component carrier optical signal 912A, 912B, 912C, 914A, 914B, 914C and hence the variation in frequency for each of these signals.

Decorrelator receives as it inputs the unique time offsets corresponding to each carrier optical signal which is applied to the pseudorandom binary sequence signal 956A to recover the phase modulated carrier optical signals. In this illustrative embodiment, the unique time offset correspond to a combination of the time offset applied as a result of modulators 942, 944 (ie, $\Delta \tau_i$) and the time offset applied as a result of phase modulator 940 in combination with wavelength selective reflectors 925A, 925B, 925C (ie, $\Delta t_i$).

In the case of a single pseudorandom binary sequence signal generator 956 generating a pseudorandom binary sequence signal 956A r(t) consisting of a pseudorandom sequence of ±1 which for the general case of i fibers is then delayed for each fiber by an amount $t_i$, assuming that the injected phase on the $i^{th}$ fiber satisfies the relationship that $\Delta\phi_{ran}^{i}(t)=\Delta\phi_{ran}^{i}(t-\Delta t)+r(t-t_i)\pi/2$.

Supposing further that each fiber carries M frequency separated optical components of wavelengths $\lambda_m$ and suppose the time delay for the $m^{th}$ wavelength is $m\Delta t$ then the interferometer output as provided by photodetector 930 and analog to digital converter 970 is given by:

$$I(t) = \sum_i \sum_m \prod_{j=0}^{m-1} r(t-t_i-j\Delta t)\cos(\varphi_0^{(im)} + \Delta\varphi(t) + m\Delta t \Delta v^{(im)}(t)) + \text{cross terms} \qquad \text{Equation 16}$$

In the digital domain, the $n^{th}$ sample recorded by the photodetector may then be written as:

$$I_n = \sum_i \sum_m \prod_{j=0}^{m-1} r_{n-T_i-jT} \cos(\Delta\varphi_p + \varphi_{im}) + \text{cross terms} \qquad \text{Equation 17}$$

where $\Delta\phi_p$ is the RF phase modulation in accordance with Equation 9, $T_i$ is the number of samples corresponding to the time delay $t_i$ and T is the number of samples corresponding to the time delay $\Delta t$. Since $r_n$ consists of a pseudorandom sequence taking values±1, a new sequence may be defined as:

$$s_n^{(m)} = \prod_{j=0}^{m-1} r_{n-jT} \qquad \text{Equation 18}$$

which is also a pseudorandom sequence taking values±1. Then the signal at the $m^{th}$ wavelength on the $i^{th}$ fiber is then obtained from the convolution:

$$I_p^{(im)}=N^{-1}\Sigma_{n=Np/4}^{N(p+1)/4}s_{n-T_i}^{(m)}I_m=\cos(\Delta\phi_p+\phi_{im}) \qquad \text{Equation 19}$$

From Equation 19, phase demodulation in demodulator 880 can proceed as normal for each component signal corresponding to each sensor using Equation 6 above.

As would be appreciated, fiber optic sensor arrangement 900 further simplifies the sensor arrangement 800 depicted in FIG. 6 by removing the requirement for demultiplexer 870 and the separate analysis stages for each wavelength band. It can be seen, that the methods and systems described above may be readily applied to fiber optic based sensors involving multiple fibers each having sensors operating in the same wavelength band without having to resort to multiplexing arrangements that are employed in prior art systems such as illustrated in FIG. 2.

As would be further appreciated, the above described embodiments may be separated into a sensor system and the remaining signal processing system where the sensor system is able to be decoupled from the sensor system and interchanged with another sensor system as required. In this manner, the sensor system provides an output of multiple optical carrier signals which is received by the data input stage of the signal processing system. In other embodiments, the signal processing system may not necessarily be coupled to a sensor system but may process any plurality of optical carrier signals where information is conveyed as a result of modifications in each optical carrier signal.

Throughout the specification, the terms "wavelength" ($\lambda$) and "frequency" (f) are used interchangeably as they are reciprocally related by the associated speed of light of the medium (c) in which the light is propagating by the well-known relationship Δf=c.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgment of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions, without departing from the scope of the invention as set forth and defined by the following claims.

The invention claimed is:

1. A fiber optic sensor arrangement including:
    a plurality of optical fiber based sensor elements, the sensor elements configured to modify an associated optical carrier signal in accordance with changes in a sensed quantity at a location of the sensor element;
    a phase modulation arrangement for phase modulating each optical carrier signal in accordance with respective uncorrelated pseudorandom binary sequence signals;
    an interferometer module for receiving each of the phase modulated optical carrier signals, the interferometer module operable to convert a change in the phase modulated optical carrier signals to a change in optical intensity of the corresponding optical carrier signal to generate a combined modulated optical intensity signal;
    an optical intensity detector for measuring the combined modulated optical intensity signal and generating a time varying electrical detector signal;
    an analog to digital convertor to convert the time varying electrical detector signal to a time varying digitized detector signal;
    a decorrelator arrangement for decorrelating the time varying digitized detector signal against the respective uncorrelated pseudorandom binary sequence corresponding to each of the optical carrier signals to recover each of the modulated optical carrier signals; and
    a demodulator for demodulating each of the modulated optical carrier signals to recover the respective optical carrier signal to determine the changes in the sensed quantity at the location of the sensor element.

2. The fiber optic sensor arrangement of claim 1, wherein the respective uncorrelated pseudorandom binary sequence signals are generated from a common pseudorandom binary sequence signal shifted by a unique time offset.

3. The fiber optic sensor arrangement of claim 2, wherein the unique time offset for the respective uncorrelated pseudorandom binary sequence signal is introduced by varying the optical path length in the interferometer module for the corresponding optical carrier signal.

4. The fiber optic sensor arrangement of claim 3, wherein the optical path length for each optical carrier signal is varied by introducing wavelength selective reflectors in an optical path of the interferometer module, the wavelength selective reflectors operable to selectively reflect the corresponding optical carrier signal.

5. The fiber optic sensor arrangement of claim 2, wherein the phase modulation arrangement includes a phase modulator operating on a fiber conveying an optical signal comprising at least one optical carrier signal, the phase modulator operating in accordance with the common pseudorandom binary sequence signal shifted by the unique time offset corresponding to each of the fibers.

6. The fiber optic sensor arrangement of claim 1, wherein the phase modulation arrangement includes a periodic phase modulator operable to additionally phase modulate each optical carrier signal by a predetermined periodic phase modulation on a common optical path traversed by all optical carrier signals.

7. The fiber optic sensor arrangement of claim 1, wherein the optical carrier signals comprise frequency separated component optical signals whose frequency vary with changes in a sensed quantity at a location of the sensor element.

8. The fiber optic sensor arrangement of claim 1, wherein the plurality of optical fiber based sensor elements are arranged on a unitary optical fiber.

9. The fiber optic sensor arrangement of claim 1, wherein the plurality of optical fiber based sensor elements are arranged on a plurality of optical fibers.

10. The fiber optic sensor arrangement of claim 1, wherein the plurality of optical fibers each include fiber based sensor elements modifying the same or similar optical carrier signal.

11. A sensor system comprising:
    a sensor array generating a plurality of frequency separated component optical carrier signals forming together an optical signal conveyed by an optical transmission means;
    a phase modulation signal generator for generating a phase modulation signal, the phase modulation signal generator including a pseudorandom binary sequence signal generator to generate a pseudorandom binary sequence signal;
    an interferometer comprising a first optical path and a second optical path for both receiving the optical signal, wherein the first optical path includes an optical modulator to receive the optical signal and form a phase modulated optical signal in accordance with the phase modulation signal, the first optical path further including respective wavelength selective reflectors for introducing a respective time delay for each frequency separated component optical signal of the phase modulated optical signal to be then combined on reflection with the optical signal from the second optical path to form a combined optical intensity signal;
    a photodetector to measure an intensity of the combined optical intensity signal from the interferometer and to generate a time varying electrical detector signal;
    an analog to digital convertor to convert the time varying electrical detector signal to a time varying digitized detector signal;
    a decorrelator arrangement including a plurality of decorrelation channels corresponding to each of the frequency separated component optical signals, each decorrelation channel receiving as an input the time varying digitized detector signal from the analog to digital converter and operable to recover a phase modulated component signal corresponding to an individual frequency separated component optical carrier signal based on the respective time delay for that frequency separated component optical carrier signal introduced by the respective wavelength selective reflector and the pseudorandom binary sequence signal; and a demodulator arrangement including a plurality of demodulation channels to demodulate each phase modulated component signal to determine the individual frequency variations of the plurality of frequency separated component optical carrier signals.

12. The sensor system of claim 11, wherein the phase modulation signal generator includes an offset signal generator to generate a periodic phase modulation signal to be combined with the pseudorandom binary sequence signal.

13. The system of claim 11, wherein one or more of the respective wavelength selective reflectors includes a fiber Bragg grating based reflector tuned to the respective frequency separated component optical signal.

14. A system for combining a first optical signal comprising a first plurality of frequency separated component optical signals conveyed by a first optical transmission means with a second optical signal comprising a second plurality of frequency separated component optical signals conveyed by a second optical transmission means, the second plurality of frequency separated component optical signals having the same or similar wavelengths to the first plurality of frequency separated component optical signals means to form a combined optical signal for conveyance along a third optical transmission means, the system including:

a first pseudorandom binary sequence signal generator to generate a first pseudorandom binary sequence signal at a sequence frequency greater than any of the frequencies of the component optical signals of the first optical signal;

a first optical modulator operable to phase modulate the first optical signal in accordance with the first pseudorandom binary sequence signal to form a first phase modulated optical signal;

a second pseudorandom binary sequence signal generator to generate a second uncorrelated pseudorandom binary sequence signal at a sequence frequency greater than any of the frequencies of the component optical signals of the second optical signal;

a second optical modulator operable to phase modulate the second optical signal in accordance with the second pseudorandom binary sequence signal to form a second phase modulated optical signal; and an optical combiner to combine the first phase modulated optical signal and the second phase modulated optical signal to form a combined optical signal.

15. The system as claimed in claim 14, wherein the second pseudorandom binary sequence signal generator is formed by shifting the first pseudorandom binary sequence signal by a predetermined time.

16. The system as claimed in claim 14, further including a demultiplexer arrangement to separate the first plurality of frequency separated component optical signals and the corresponding second plurality of frequency separated component optical signals from the combined optical signal, the demultiplexing arrangement including:

a wavelength demultiplexer to separate the combined optical signal into wavelength bands corresponding to the frequency separated component optical signals of the first and second optical signals;

a plurality of photodetectors corresponding to each wavelength band to measure an intensity of the wavelength band to generate a respective time varying electrical detector signal;

a plurality of analog to digital convertors to convert the respective time varying electrical detector signals to respective time varying digitized detector signals corresponding to each wavelength band;

for each respective time varying digitized detector signal a decorrelator arrangement including a first channel and a second channel, the first channel receiving as an input the respective time varying digitized signal and operable to recover a phase modulated component signal corresponding to that wavelength band for the first optical signal based on the first pseudorandom binary sequence signal and the second channel also receiving as an input the respective time varying digitized signal and operable to recover a phase modulated component signal corresponding to that wavelength band for the second optical signal based on the second pseudorandom binary sequence signal.

17. A signal processing signal system including:

a data input stage for receiving a plurality of optical carrier signals, where respective modifications in each optical carrier signal convey information carried by the optical carrier signal;

a phase modulation arrangement for phase modulating each optical carrier signal in accordance with respective uncorrelated pseudorandom binary sequence signals;

an interferometer module for receiving each of the phase modulated optical carrier signals, the interferometer module operable to convert a change in the phase modulated optical carrier signals to a change in optical intensity of the corresponding optical carrier signal to generate a combined modulated optical intensity signal;

an optical intensity detector for measuring the combined modulated optical intensity signal and generating a time varying electrical detector signal;

an analog to digital convertor to convert the time varying electrical detector signal to a time varying digitized detector signal;

a decorrelator arrangement for decorrelating the time varying digitized detector signal against the respective uncorrelated pseudorandom binary sequence corresponding to each of the optical carrier signals to recover each of the modulated optical carrier signals; and a demodulator for demodulating each of the modulated optical carrier signals to recover the respective optical carrier signal to determine the information conveyed by each optical carrier signal.

* * * * *